US 11,548,527 B2

(12) United States Patent
Hegde et al.

(10) Patent No.: US 11,548,527 B2
(45) Date of Patent: Jan. 10, 2023

(54) CONTROL SYSTEMS AND METHODS USING PARAMETRIC DRIVER MODEL

(71) Applicants: GM GLOBAL TECHNOLOGY OPERATIONS LLC, Detroit, MI (US); Carnegie Mellon University, Pittsburgh, PA (US)

(72) Inventors: Bharatkumar Hegde, Bloomfield Hills, MI (US); Junfeng Zhao, Troy, MI (US); Lung En Jan, Pittsburgh, PA (US); Chen-fang Chang, Bloomfield Hills, MI (US); Ragunathan Rajkumar, Monroeville, PA (US)

(73) Assignees: GM GLOBAL TECHNOLOGY OPERATIONS LLC, Detroit, MI (US); Carnegie Mellon University, Pittsburgh, PA (US)

( * ) Notice: Subject to any disclaimer, the term of this patent is extended or adjusted under 35 U.S.C. 154(b) by 139 days.

(21) Appl. No.: 16/884,198

(22) Filed: May 27, 2020

(65) Prior Publication Data

US 2021/0370969 A1 Dec. 2, 2021

(51) Int. Cl.
*B60W 60/00* (2020.01)
*B60W 40/105* (2012.01)
(Continued)

(52) U.S. Cl.
CPC ......... *B60W 60/001* (2020.02); *B60W 10/06* (2013.01); *B60W 30/162* (2013.01); *B60W 40/072* (2013.01); *B60W 40/08* (2013.01); *B60W 40/105* (2013.01); *B60W 40/13* (2013.01); *F02D 9/08* (2013.01); *F02D 41/30* (2013.01); *F02P 5/04* (2013.01); *B60W 2420/40* (2013.01); *B60W 2510/1005* (2013.01); *B60W 2552/20* (2020.02); *B60W 2554/80* (2020.02);
(Continued)

(58) Field of Classification Search
CPC ............... B60W 60/001; B60W 10/06; B60W 30/162; B60W 40/072
See application file for complete search history.

(56) References Cited

U.S. PATENT DOCUMENTS 6,405,106 B1 6/2002 Sheth et al.
7,360,615 B2 4/2008 Salman et al.
(Continued)

FOREIGN PATENT DOCUMENTS

WO WO-2015/051289 A1 4/2015

OTHER PUBLICATIONS

U.S. Appl. No. 16/559,738, filed Sep. 4, 2019, Zhao et al.
(Continued)

*Primary Examiner* — Peter D Nolan
*Assistant Examiner* — Wae L Louie (57) ABSTRACT

A control system of a vehicle includes: a target speed module configured to, using a parametric driver model and based on first driver parameters, second driver parameters, and vehicle parameters, determine a target vehicle speed trajectory for a future predetermined period; a driver parameters module configured to determine the first driver parameters based on conditions within a predetermined distance in front of the vehicle; and a control module configured to adjust at least one actuator of the vehicle based on the target vehicle speed trajectory and a present vehicle speed.

19 Claims, 4 Drawing Sheets

(51) Int. Cl.
| | |
|---|---|
| *B60W 30/16* | (2020.01) |
| *B60W 40/072* | (2012.01) |
| *B60W 40/13* | (2012.01) |
| *F02D 9/08* | (2006.01) |
| *F02D 41/30* | (2006.01) |
| *F02P 5/04* | (2006.01) |
| *B60W 10/06* | (2006.01) |
| *B60W 40/08* | (2012.01) |

(52) U.S. Cl.
CPC ..... *B60W 2555/60* (2020.02); *B60W 2556/45* (2020.02)

(56) References Cited

U.S. PATENT DOCUMENTS

| | | | |
|---|---|---|---|
| 7,539,562 | B2 | 5/2009 | Maguire et al. |
| 7,653,469 | B2 | 1/2010 | Bai et al. |
| 8,073,605 | B2 | 12/2011 | Naik et al. |
| 8,095,290 | B2 | 1/2012 | Smyth et al. |
| 8,099,220 | B2 | 1/2012 | Kim et al. |
| 8,214,122 | B2 | 7/2012 | Krupadanam et al. |
| 8,239,076 | B2 | 8/2012 | McGarry et al. |
| 8,260,481 | B2 | 9/2012 | Naik et al. |
| 8,290,637 | B2 | 10/2012 | Krupadanam et al. |
| 8,374,740 | B2 | 2/2013 | Druenert et al. |
| 8,392,091 | B2 | 3/2013 | Hebbale et al. |
| 8,392,112 | B2 | 3/2013 | Bradburn et al. |
| 8,504,258 | B2 | 8/2013 | Tiberg |
| 8,606,483 | B2 | 12/2013 | Krupadanam et al. |
| 10,081,360 | B2 | 9/2018 | Hu et al. |
| 10,099,702 | B2 | 10/2018 | Muldoon et al. |
| 10,215,576 | B2 | 2/2019 | Kang et al. |
| 10,783,559 | B1* | 9/2020 | Tran .......................... G09F 9/00 |
| 10,816,993 | B1* | 10/2020 | Tran ..................... G05D 1/0088 |
| 2006/0064232 | A1 | 3/2006 | Ampunan et al. |
| 2012/0046803 | A1* | 2/2012 | Inou ........................ A61B 5/163 701/1 |
| 2017/0327110 | A1* | 11/2017 | Inoue ..................... B60W 10/20 |
| 2019/0378041 | A1* | 12/2019 | Dhansri .................. G06N 3/006 |
| 2021/0179092 | A1* | 6/2021 | Chen ...................... B60W 10/04 |
| 2021/0188262 | A1* | 6/2021 | Goto ................. B60W 30/0956 |
| 2021/0370969 | A1* | 12/2021 | Hegde .................. F02D 41/021 |

OTHER PUBLICATIONS

Arne Kesting, Martin Treiber, and Dirk Helbing. Enhanced intelligent driver model to access the impact of driving strategies on traffic capacity. Philosophical Transactions of the Royal Society of London A: Mathematical, Physical and Engineering Sciences, 368(1928):4585-4605, Oct. 2010.

* cited by examiner

CONTROL SYSTEMS AND METHODS USING PARAMETRIC DRIVER MODEL

GOVERNMENT SUPPORT

This invention was made with government support under Grant No. DE-AR0000790 awarded by the U.S. Department of Energy. The Government has certain rights in this invention.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle control systems and methods and more particularly to systems and methods for generating target vehicle speed profiles.

Vehicles include one or more torque producing devices, such as an internal combustion engine and/or an electric motor. A passenger of a vehicle rides within a passenger cabin (or passenger compartment) of the vehicle.

Autonomous driving systems drive a vehicle completely independent of a human driver. For example, autonomous driving systems control the acceleration, brake, and steering systems of a vehicle independent of a driver.

Semiautonomous driving systems drive a vehicle partially independent of a human driver. For example, a semiautonomous driving system may control the steering system independent of a driver while relying on the driver to set a target speed for the semiautonomous driving system to achieve by controlling the acceleration and brake systems.

SUMMARY

In a feature, a control system of a vehicle includes: a target speed module configured to, using a parametric driver model and based on first driver parameters, second driver parameters, and vehicle parameters, determine a target vehicle speed trajectory for a future predetermined period; a driver parameters module configured to determine the first driver parameters based on conditions within a predetermined distance in front of the vehicle; and a control module configured to adjust at least one actuator of the vehicle based on the target vehicle speed trajectory and a present vehicle speed.

In further features, a camera is configured to capture images within a field of view (FOV) in front of the vehicle, and the driver parameters module is configured to determine the first driver parameters based on at least one image captured by the camera.

In further features, the second driver parameters are predetermined fixed values stored in memory.

In further features, a conditions module is configured to obtain at least one of the conditions wirelessly from a data source that is remote from the vehicle.

In further features, the conditions include a speed limit of a road within the predetermined distance in front of the vehicle.

In further features, the conditions include a grade of a road within the predetermined distance in front of the vehicle.

In further features, the conditions include a curvature of a road within the predetermined distance in front of the vehicle.

In further features, the conditions include one of a location of a traffic signal within the predetermined distance in front of the vehicle and a distance between the vehicle and the traffic signal.

In further features, the conditions include a speed of a vehicle within the predetermined distance in front of the vehicle.

In further features, the conditions include a distance between the vehicle and a vehicle within the predetermined distance in front of the vehicle.

In further features, the conditions include: a speed limit of a road within the predetermined distance in front of the vehicle; a grade of a road within the predetermined distance in front of the vehicle; a curvature of a road within the predetermined distance in front of the vehicle; one of a location of a traffic signal within the predetermined distance in front of the vehicle and a distance between the vehicle and the traffic signal; a speed of another vehicle within the predetermined distance in front of the vehicle; and a distance between the vehicle and the other vehicle within the predetermined distance in front of the vehicle.

In further features, the vehicle parameters include a mass of the vehicle.

In further features, the vehicle parameters include a present gear ratio of a transmission of the vehicle.

In further features, the vehicle parameters include torque limits of the vehicle.

In further features, the vehicle parameters include acceleration limits of the vehicle.

In further features: the driver parameters module is configured to determine possible sets of the first driver parameters based on the conditions within the predetermined distance in front of the vehicle; and the target speed module is configured to: determine cost values for the possible sets based on the possible sets, respectively; select one of the possible sets having a lowest cost value; and using the parametric driver model, based on the selected one of the possible sets of first driver parameters, the second driver parameters, and the vehicle parameters, determine the target vehicle speed trajectory for the future predetermined period.

In further features, the predetermined period is greater than zero seconds.

In further features, the second driver parameters are at least one of adjusted and selected based on at least one of the conditions and a driver preference.

In further features, the control module is configured to, based on the present vehicle speed and the target vehicle speed trajectory, selectively adjust at least one of: opening of a throttle valve; fuel injection to an engine; and spark timing of the engine.

In a feature, a control method for a vehicle includes: using a parametric driver model and based on first driver parameters, second driver parameters, and vehicle parameters, determining a target vehicle speed trajectory for a future predetermined period; determining the first driver parameters based on conditions within a predetermined distance in front of the vehicle; and adjusting at least one actuator of the vehicle based on the target vehicle speed trajectory and a present vehicle speed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine control module can control actuators of an engine based on driver input, such as an accelerator pedal position, a brake pedal position, a cruise control input, etc. For example, the engine control module may control fueling of the engine, spark timing of the engine, opening of a throttle valve, intake and exhaust valve actuation.

The present application involves using a parametric driver model to determine a target vehicle speed trajectory based on first driver parameters, second driver parameters, and vehicle parameters. Parametric driver models allow a limited set of driver parameters to be used to recreate driving behavior for conditions in front of the vehicle. The first driver parameters are determined in real time based on conditions around (e.g., in front of) the vehicle, such as a grade of the road in front of the vehicle, a curvature of the road in front of the vehicle, locations of (or distances to) traffic lights in front of the vehicle, a speed of a vehicle immediately in front of the vehicle, a distance between the vehicle and the vehicle immediately in front of the vehicle, and location and speed of other vehicles around the vehicle. The second driver parameters are calibrated (optimized) for different external conditions such as weather, temperature etc. during vehicle design and stored, and can be chosen via an interface by the driver or the automated driving system based on external conditions.

Figure 1:
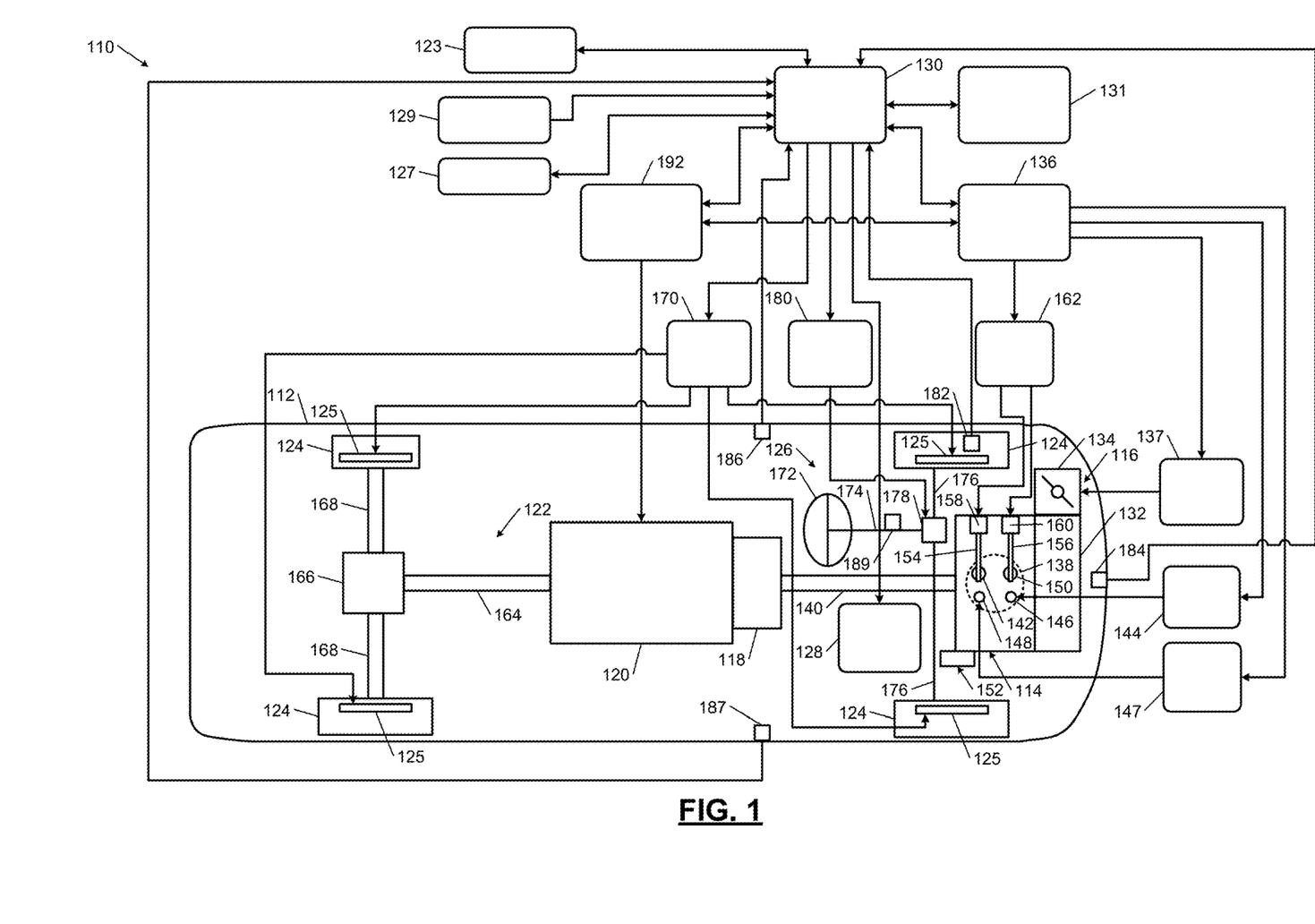
FIG. 1 is a functional block diagram of an example vehicle system.

FIG. 1 includes a functional block diagram including an example vehicle system. A vehicle 110 includes a vehicle body 112, an engine 114, an intake system 116, a torque converter 118, a transmission 120, a driveline 122, wheels 124, friction brakes 125, a steering system 126, and a display 128. The engine 114 combusts an air/fuel mixture to produce drive torque for the vehicle 110. The amount of drive torque produced by the engine 114 is controlled based on an input from a driving control module (DCM) 130. The amount of drive torque produced by the engine 114 may also be controlled based on one or more other inputs, such as a position of an accelerator pedal, a position of a brake pedal, etc. The input from the DCM 130 may be a target vehicle speed trajectory for the next predetermined period from a present time. The predetermined period may be calibrated and set to X seconds, where X is an number greater than 0. In various implementations, X may be equal to 15. The torque output of the engine 114 may be controlled to adjust a vehicle speed to the target vehicle speed trajectory over the predetermined period.

The DCM 130 generates the target vehicle speed trajectory using a parametric driver model (PDM), as discussed further below. The DCM 130 may determine the target vehicle speed trajectory based on vehicle parameters (e.g., mass, torque limits, gear, acceleration limits, offline optimized driver parameters (e.g., aggression, minimum period to a vehicle in front of the vehicle 110, an unforced braking parameter, and a period to stop the vehicle 110), and real-time optimized driver parameters (e.g., speed factor, and headway to the vehicle in front of the vehicle 110). The DCM 130 may determine the real-time optimized driver parameters based on look-ahead data. The look-ahead data may include, for example, speed limits within a predetermined distance in front of the vehicle, road grade within the predetermined distance in front of the vehicle, locations of any traffic lights within the predetermined distance in front of the vehicle, road curvature within the predetermined distance in front of the vehicle, a speed of the vehicle in front of the vehicle 110, and a distance of the vehicle in front of the vehicle 110.

The DCM 130 may determine the look-ahead data, for example, based on a location and heading of the vehicle provided by a global positioning system (GPS) module 131 (or a global navigation satellite system (GNSS)), based on one or more images captured using one or more exterior cameras 129, from one or more sources that are remote from the vehicle (e.g., based on the location and heading of the vehicle 110), or from other vehicles and/or infrastructure near the vehicle 110. The DCM 130 may obtain data from remote sources, for example, via a transceiver 127 configured to communicate wirelessly, such as via a cellular network. Data from other vehicles and/or infrastructure may be received via a vehicle to vehicle (V2V) and/or vehicle to infrastructure (V2I) transceiver 123. For example, the DCM 130 may obtain the speed limit by using optical character recognition on a speed limit sign captured in an image captured using one or more of the cameras 129. The DCM 130 may obtain the speed limit additionally or alternatively from a remote source based on the location and heading of the vehicle 110. The GPS module 131 may be onboard (e.g., part of) the vehicle 110 or the GPS module 131 may be remote from (e.g., separate from) the vehicle 110. The GPS module 131 includes a transceiver for communicating with a satellite system.

Air is drawn into the engine 114 through the intake system 116. The intake system 116 includes an intake manifold 132 and a throttle valve 134. The throttle valve 134 may include a butterfly valve having a rotatable blade. Based on the target vehicle speed trajectory, an engine control module (ECM) 136 controls a throttle actuator module 137, and the throttle actuator module 137 regulates opening of the throttle valve 134 to control the amount of air drawn into the intake manifold 132.

Air from the intake manifold 132 is drawn into cylinders of the engine 114. While the engine 114 may include multiple cylinders, for illustration purposes a single representative cylinder 138 is shown. For example only, the engine 114 may include 2, 3, 4, 5, 6, 8, 10, and/or 12 cylinders. The ECM 136 may deactivate some of the cylinders, which may improve fuel economy under certain engine operating conditions.

The engine 114 may operate using a four-stroke cycle. The four strokes, described below, are named the intake stroke, the compression stroke, the combustion stroke, and the exhaust stroke. During each revolution of a crankshaft 140, two of the four strokes occur within the cylinder 138. Therefore, two crankshaft revolutions are necessary for the cylinder 138 to experience all four of the strokes.

During the intake stroke, air from the intake manifold 132 is drawn into the cylinder 138 through an intake valve 142. The ECM 136 controls a fuel actuator module 144, which regulates fuel injections performed by a fuel injector 146 to achieve a target air/fuel ratio. Fuel may be injected into the intake manifold 132 at a central location or at multiple locations, such as near the intake valve 142 of each of the cylinders. In various implementations, fuel may be injected directly into the cylinders or into mixing chambers associated with the cylinders. The fuel actuator module 144 may halt injection of fuel to cylinders that are deactivated.

The injected fuel mixes with air and creates an air/fuel mixture in the cylinder 138. During the compression stroke, a piston (not shown) within the cylinder 138 compresses the air/fuel mixture. The engine 114 may be a compression-ignition engine, in which case compression in the cylinder 138 ignites the air/fuel mixture. Alternatively, the engine 114 may be a spark-ignition engine, in which case a spark actuator module 147 energizes a spark plug 148 to generate a spark in the cylinder 138 based on a signal from the ECM 136, which ignites the air/fuel mixture. The timing of the spark may be specified relative to the time when the piston is at its topmost position, referred to as top dead center (TDC).

The spark actuator module 147 may be controlled by a spark timing signal specifying how far before or after TDC to generate the spark. Because piston position is directly related to crankshaft rotation, operation of the spark actuator module 147 may be synchronized with crankshaft angle. In various implementations, the spark actuator module 147 may halt provision of spark to deactivated cylinders.

During the combustion stroke, combustion of the air/fuel mixture drives the piston down, thereby driving the crankshaft 140. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 150. The byproducts of combustion are exhausted from the vehicle via an exhaust system 152.

The intake valve 142 may be controlled by an intake camshaft 154, while the exhaust valve 150 may be controlled by an exhaust camshaft 156. In various implementations, multiple intake camshafts (including the intake camshaft 154) may control multiple intake valves (including the intake valve 142) for the cylinder 138 and/or may control the intake valves (including the intake valve 142) of multiple banks of cylinders (including the cylinder 138). Similarly, multiple exhaust camshafts (including the exhaust camshaft 156) may control multiple exhaust valves for the cylinder 138 and/or may control exhaust valves (including the exhaust valve 150) for multiple banks of cylinders (including the cylinder 138).

The time at which the intake valve 142 is opened may be varied with respect to piston TDC by an intake cam phaser 158. The time at which the exhaust valve 150 is opened may be varied with respect to piston TDC by an exhaust cam phaser 160. A valve actuator module 162 may control the intake and exhaust cam phasers 158, 160 based on signals from the ECM 136. When implemented, variable valve lift may also be controlled by the valve actuator module 162.

The valve actuator module 162 may deactivate the cylinder 138 by disabling opening of the intake valve 142 and/or the exhaust valve 150. The valve actuator module 162 may disable opening of the intake valve 142 by decoupling the intake valve 142 from the intake cam phaser 158. Similarly, the valve actuator module 162 may disable opening of the exhaust valve 150 by decoupling the exhaust valve 150 from the exhaust cam phaser 160. In various implementations, the valve actuator module 162 may control the intake valve 142 and/or the exhaust valve 150 using devices other than camshafts, such as electromagnetic or electrohydraulic actuators.

The ECM 136 adjusts the position of the throttle valve 134, the amount and/or timing of fuel injections performed by the fuel injector 146, the timing at which spark is generated by the spark plug 148, and/or the timing at which the intake and exhaust valves 142 and 150 are opened to achieve a target torque output of the engine 114.

The ECM 136 determines the target engine torque (for a time) based on the target vehicle speed trajectory (the target vehicle speed for that time).

Torque output at the crankshaft 140 is transferred through the torque converter 118, through the transmission 120, through the driveline 122, and to the wheels 124. The driveline 122 includes a drive shaft 164, a differential 166, and axle shafts 168. The torque converter 118, the transmission 120, and the differential 166 adjust engine torque using gear ratios to provide axle torque at the axle shafts 168. The axle torque rotates the wheels 124, which causes the vehicle 110 to accelerate in a forward or rearward direction.

The friction brakes 125 are mounted to the wheels 124. The friction brakes 125 resist (slow) rotation of the wheels 124 when the friction brakes 125 are applied. The friction brakes 125 may include drum brakes and/or disc brakes, and may include electrohydraulic actuators, electromechanical actuators, or another suitable type of actuators that press a brake pad against a brake disc and/or drum when the friction brakes 125 are applied. A brake actuator module 170 applies the friction brakes 125 based on a brake pedal position and/or a signal from the DCM 130. The friction brakes 125 may be independently applied at different levels. The DCM 130 may apply the friction brakes 125, for example, to maintain the target vehicle speed and/or to maintain at least the predetermined distance between the vehicle and an object in front of the vehicle 110.

The steering system 126 selectively turns the front wheels 124, thereby turning the vehicle 110. The steering system 126 includes a steering wheel 172, a steering column 174, one or more steering linkages 176, and a steering actuator 178. A driver may rotate the steering wheel 172 to turn the vehicle 110 left or right or to input a request to turn the vehicle 110 left or right. The steering column 174 is coupled to the steering wheel 172 so that the steering column 174 rotates when the steering wheel 172 is rotated. The steering column 174 may also be coupled to the steering linkages 176 so that rotation of the steering column 174 causes translation of the steering linkages 176. The steering linkages 176 are coupled to the front wheels 124 so that translation of the steering linkages 176 turns the wheels 124.

The steering actuator 178 is coupled to the steering linkages 176 and translates the steering linkages 176, thereby turning the front wheels 124. In various implementations, the steering actuator 178 may be an electrohydraulic and/or electromechanical actuator. In implementations where the steering column 174 is coupled to the steering linkages 176, such as power steering systems, the steering actuator 178 may reduce the amount of effort that the driver must exert to turn the vehicle 110 left or right. In various implementations, the steering column 174 may not be coupled to the steering linkages 176, and the steering actuator 178 alone may translate the steering linkages 176. Steering systems where the steering column 174 is not coupled to the steering linkages 176 may be referred to as a steer-by-wire system.

A steering actuator module 180 adjusts actuation of the steering actuator 178 based on a signal from the DCM 130.

The DCM 130 may control the steering actuator 178 based on the angular position of the steering wheel 172. Alternatively, the DCM 130 may control the steering actuator 178 autonomously (e.g., independent of the angular position of the steering wheel 172). For example, the DCM 130 may control the steering actuator 178 to minimize a difference between a target path of the vehicle 110 and an actual path of the vehicle 110 or to center the vehicle 110 between lane lines. As another example, the DCM 130 may control the steering actuator 178 to cause the vehicle to not contact one or more targets located in the path of the vehicle.

One or more wheel speed sensors 182 are mounted to one or more of the wheels 124 and measures the speed of wheels 124, respectively. For example, one wheel speed sensor may be provided for each wheel and measure that wheels wheel speed.

A forward facing camera 184 captures images within a predetermined field of view (FOV) in front of the vehicle 110. The forward facing camera 184 may be located, for example, in a front fascia of the vehicle 110, in a rear view mirror inside of a front wind shield of the vehicle, or at another suitable location.

The vehicle 110 may also include one or more other object sensors. For example, side facing cameras 186 and 187 may be mounted to the left and right sides of the vehicle body 112 and generate images of the environment on the left and right sides of the vehicle 110, respectively. The side facing cameras 186 and 187 may be implemented under left and right outside rear view mirrors, respectively, of the vehicle. The vehicle 110 may also include one or more other types of external cameras and sensors, such as one or more radar sensors, one or more sonar sensors, one or more light detection and ranging (LIDAR) sensors, and/or one or more other cameras.

An accelerometer may be mounted to (e.g., the rear of) the vehicle body 112 and measures the lateral, longitudinal, and/or vertical acceleration of the vehicle 110. The accelerometer may include a triaxial accelerometer, a dual-axis accelerometer, and/or one or more single-axis accelerometers. In one example, the accelerometer is a dual-axis accelerometer that measures the lateral and longitudinal acceleration of the vehicle 110.

A steering wheel angle sensor 189 measures the angular position of the steering wheel 172 relative to a predetermined position. The predetermined position may correspond to a location where the vehicle should (or does) travel straight along a longitudinal axis of the vehicle. The steering wheel angle sensor 189 may be mounted to the steering column 174 and may include, for example, a Hall Effect sensor that measures the angular position of a shaft that is disposed within the steering column 174 and rotatably coupled to the steering wheel 172.

A transmission control module (TCM) 192 shifts gears of the transmission 120 based on operating conditions of the vehicle 110 and a predetermined shift schedule. The operating conditions may include the speed of the vehicle 110, a target acceleration of the vehicle 110, and/or a target torque output of the engine 114. The TCM 192 may determine a vehicle speed based on wheel speeds measured using the wheel speed sensors 182. For example, the TCM 192 may determine the vehicle speed based on an average of the wheel speeds or an average of speeds of undriven (i.e., non-driven) wheels of the vehicle. The TCM 192 may receive the target vehicle acceleration and/or the target engine torque from the DCM 130 and/or the ECM 136. The ECM 136 may communicate with the TCM 192 to coordinate shifting gears in the transmission 120. For example, the ECM 136 may reduce engine torque during a gear shift.

The DCM 130 may adjust the target path of the vehicle 110, for example, to maintain the vehicle 110 within the boundaries of a lane in which the vehicle 110 is travelling or to avoid one or more objects in the present path of the vehicle 110. The DCM 130 may output information via the display 128 under some circumstances, such as to notify the driver of a potential lane departure. The display 128 may include an electronic display (e.g., a touchscreen display) that is within the view of the driver and is operable to display lights, text, and/or images.

While the example of a vehicle including an internal combustion engine is provided, the present application is also applicable to hybrid vehicles including both an engine and one or more electric motors, electric vehicles that include one or more electric motors and do not include an internal combustion engine. The present application is applicable to autonomous vehicles, semi-autonomous vehicles, and non-autonomous vehicles.

Figure 2:
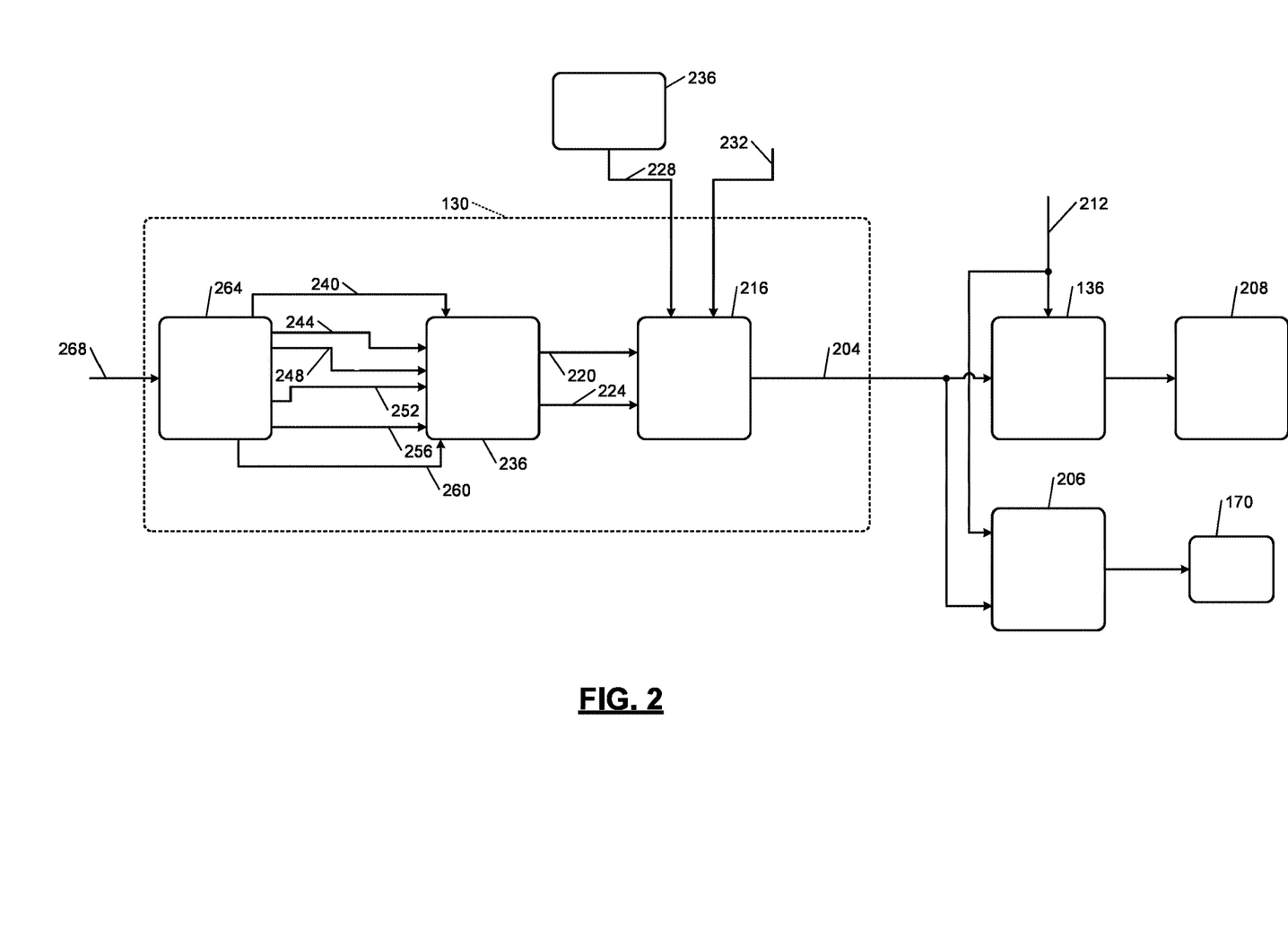
FIG. 2 is a functional block diagram of an example vehicle control system.

FIG. 2 includes a functional block diagram of an example vehicle control system. The DCM 130 determines a target (vehicle) speed trajectory 204 for the next predetermined period (e.g., X seconds). The target speed trajectory 204 includes a predetermined number of target vehicle speeds for the predetermined number of times in the future, respectively. The predetermined number corresponds to the predetermined period multiplied by a rate at which the DCM 130 updates the target speed trajectory 204 (e.g., Y times per second, where Y is an integer greater than or equal to 2).

The ECM 136 controls actuators 208 of the vehicle based on the target speed trajectory 204. For example, the ECM 136 may actuate one or more of the actuators 208 in an effort to adjust a present vehicle speed 212 toward or to a first target speed of the target speed trajectory 204 for a next (future) time. The vehicle speed 212 may be determined, for example, based on one or more of the wheel speeds measured using the wheel speed sensors.

Examples of the actuators 208 include the throttle valve 134 (e.g., opening), the fuel injectors 146 (e.g., fuel mass, timing, deactivation), the spark plugs (e.g., spark timing, deactivation), the intake cam phaser 158 (e.g., position, duration, lift), the exhaust valve phaser 160 (e.g., position, duration, lift), and/or other actuators of the vehicle 110. For example, the ECM 136 may increase an opening of the throttle valve 134 and increase fueling when the vehicle speed 212 is less than the first target vehicle speed. The ECM 136 may decrease opening of the throttle valve 132 and decrease fueling when the vehicle speed 212 is greater than the first target vehicle speed. A braking control module 206 may increase application of the friction brakes 125 when the vehicle speed 212 is greater than the first target vehicle speed. The braking control module 206 may decrease application of the friction brakes 125 when the vehicle speed 212 is less than the first target vehicle speed. While the example of adjusting the actuators 208 and the friction brakes 125 has been provided, one or more other adjustments may additionally or alternatively be made to adjust the vehicle speed 212 toward or to the first speed, such as regenerative braking, (intake and/or exhaust) cam phasing, spark timing, fueling, etc.

A target speed module 216 determines the target vehicle speed trajectory based on first driver parameters (including a speed factor 220 and a period 224 to a first vehicle located in front of the vehicle 110), vehicle parameters 228, and second driver parameters 232. The first vehicle located in front of the vehicle 110 may refer to the vehicle that is located immediately in front of the vehicle 110 such that no other vehicles are located between the first vehicle and the vehicle 110 in the present lane of the vehicle 110 and the first vehicle. In various implementations, the first vehicle may be required to be within a predetermined distance (e.g., 1 kilometer) in front of the vehicle 110. The vehicle parameters 228 include a present mass of the vehicle 110, present torque limits of the vehicle 110, a present gear ratio of the transmission, and present acceleration limits of the vehicle 110.

A driver parameters module 236 may determine the vehicle parameters 228. For example, the driver parameters module 236 may determine the present mass based on a ride height of the vehicle and/or one or more other suitable parameters. The driver parameters module 236 may determine the present torque limits of the vehicle 110, for example, based on a present steering angle of the vehicle 110 and/or one or more other suitable parameters. The driver parameters module 236 may obtain the present gear ratio from the TCM 192. The driver parameters module 236 may determine the present acceleration limits of the vehicle 110, for example, based on the vehicle speed 212 and/or one or more other suitable parameters.

The second driver parameters 232 may be predetermined (calibrated) values stored in memory of the vehicle 110. The second driver parameters 232 may be fixed values. The second driver parameters 232 include, for example, an aggression value, a minimum distance between the vehicle 110 and the first vehicle located in front of the vehicle 110, an unforced braking parameter, and a period to stop the vehicle 110. The second driver parameters 232 may be changed or selected, for example, by the driver or automated driving system for different external conditions including weather, driver preference etc.

The driver parameters module 236 determines possible sets of the first driver parameters based on present conditions within the predetermined distance in front of the vehicle 110. For example, the present conditions may include a speed limit 240 within the predetermined distance in front of the vehicle 110, a grade 244 of the road within the predetermined distance in front of the vehicle 110, locations 248 of one or more traffic lights (if any) within the predetermined distance in front of the vehicle 110. The present conditions may also include a curvature 252 of the road within the predetermined distance in front of the vehicle 110, a speed 256 of the first vehicle (first vehicle speed) located in front of the vehicle 110, and a distance 260 between the vehicle 110 and the first vehicle (first vehicle distance). The driver parameters module 236 may determine the first driver parameters using one or more equations and/or lookup tables that relate one or more of the present conditions to possible sets of the first driver parameters. The target speed module 216 selects one of the possible sets of the first driver parameters to use in the determination of the target speed trajectory 204 as discussed further below.

A conditions module 264 determines or obtains the present conditions. For example the conditions module 264 may determine the present conditions using images 268 in front of the vehicle 110 provided by the camera 184. For example, the conditions module 264 may determine the speed limit 240 by recognizing a speed limit sign within an image from the camera 184 and determining the speed limit printed on the speed limit sign using OCR. Alternatively, the conditions module 264 may determine the speed limit 240 based on the present location and heading of the vehicle 110 using speed limit data stored in the vehicle 110 or at a remote source. The conditions module 264 may determine the grade 244 and the curvature 252 of the road using one or more images 268 from the camera 184. The conditions module 264 may determine the locations 248 of one or more traffic lights, for example, using object identification (e.g., speeded up robust features (SURF) and/or scale invariant feature transform (SIFT)) in one or more images from the camera 184. The conditions module 264 may determine the distance 260, for example, based on a location of the first vehicle in one or more images 268 from the camera 184 and a size (e.g., number of pixels) occupied by the first vehicle. The conditions module 264 may determine the speed 256, for example, based on a change in the distance 260 and the vehicle speed 212. While example ways of determining the present conditions are provided, the present conditions may be determined in other ways. For example, the speed 256 may be obtained using V2V communication or V2I communication. The distance 260 may be obtained, for example, from V2I communication. The locations 248 may be obtained, for example, from V2I communication. While the example of use of the images 268 in front of the vehicle 110 provided by the camera 184 is provided in the example of FIG. 2, the conditions module 264 may determine the conditions based on information from one or more other information sources, such as a stored map database, an online database access via a network, V2I communication, V2V communication, one or more radar sensors, one or more LIDAR sensors, one or more ultrasonic sensors, etc.

The target speed module 216 may determine the target speed trajectory 204 using one or more functions and/or mappings that relate the selected set of the first driver parameters, the vehicle parameters 228, and the second driver parameters 232 to the target speed trajectory 204. Determination of the target speed trajectory 204 is discussed further below.

Figure 3:
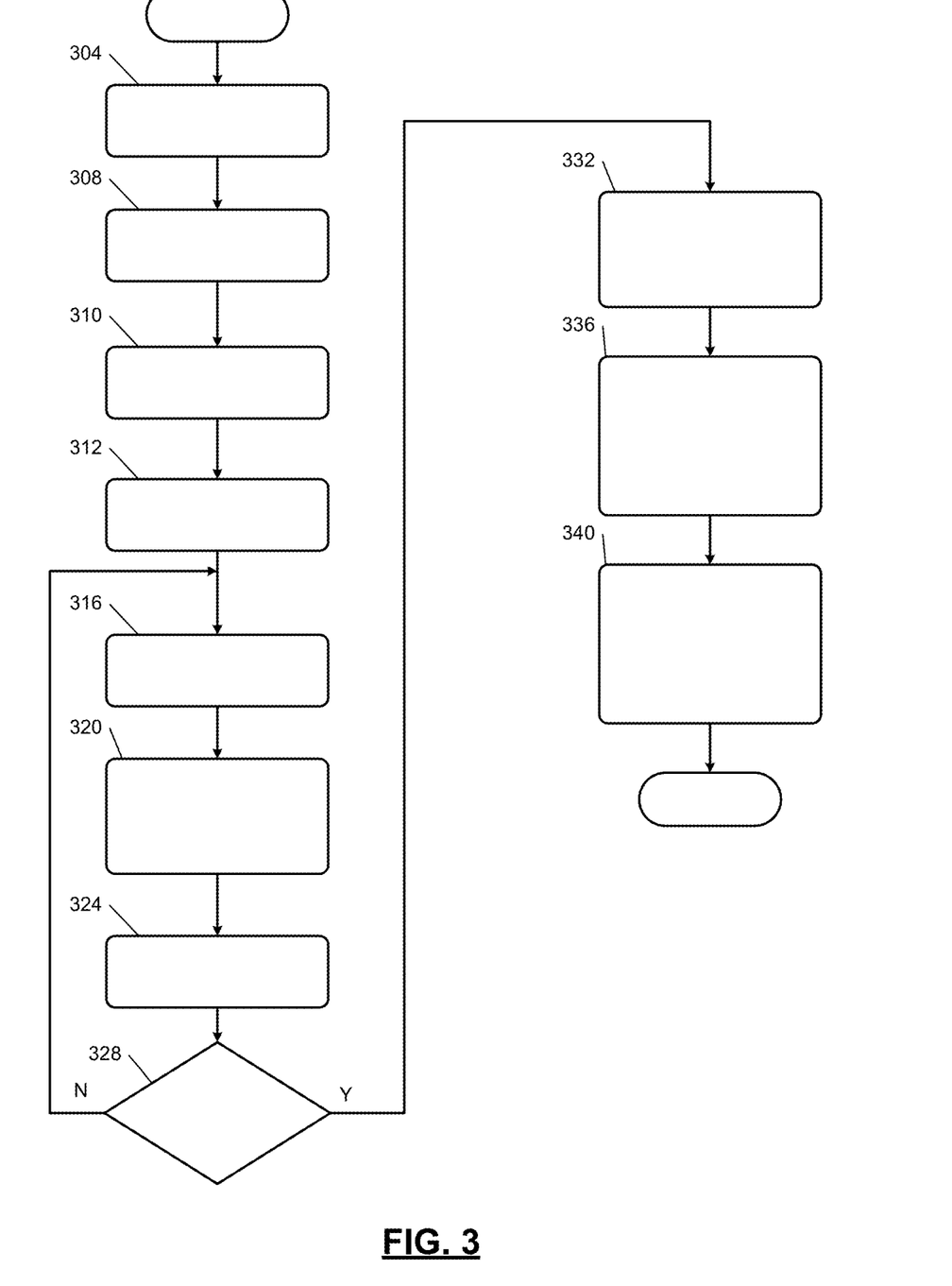
FIG. 3 is a flowchart depicting an example method of determining a target speed trajectory of a vehicle.

FIG. 3 is a flowchart depicting an example method of determining the target speed trajectory 204 and controlling vehicle actuators. Control begins with 304 where the target speed module 216 obtains the second driver parameters 232 and the vehicle parameters 228.

At 308, the conditions module 264 determines or obtains the present conditions including the speed limit 240, the grade 244, the location(s) 248 (if any), the curvature 252, the first vehicle speed 256 (if any), and the first vehicle distance 260. The driver parameters module 236 determines all possible sets of the first driver parameters based on the present conditions at 310. Each of the sets includes both a speed factor 220 and a period 224 to the first vehicle determined based on the present conditions. Not all of the possible sets, however, are feasible.

At 312, the driver parameters module 236 determines which ones of the possible sets are feasible. For example, the driver parameters module 236 may identify a possible set of the first driver parameters as being not feasible when that possible set of first driver parameters would cause one or more operating parameters to be outside of an associated predetermined range. The driver parameters module 236 may identify a possible set of the first driver parameters as being feasible when that set of first driver parameters would cause all of the operating parameters to be within the associated predetermined ranges. While the above example for identifying feasibility is provided, possible sets may be assessed for feasibility in another suitable manner. In various implementations, 312 may be omitted.

At 316, the target speed module 216 selects one of the (e.g., feasible) sets of the first driver parameters. At 320, the target speed module 216 determines a cost associated with use of the selected set based on the selected set of the first driver parameters, the vehicle parameters 228, and the second driver parameters 232. The target speed module 216 may determine the cost using one or more equations and/or lookup tables that relate the inputs to cost value. The cost value may increase as predicted fuel consumption associated with use of the selected set of the first driver parameters increases and vice versa. Thus, selected sets yielding lower cost values may be predicted to decrease fuel consumption (and increase fuel efficiency) than selected sets yielding higher cost values.

Figure 4:
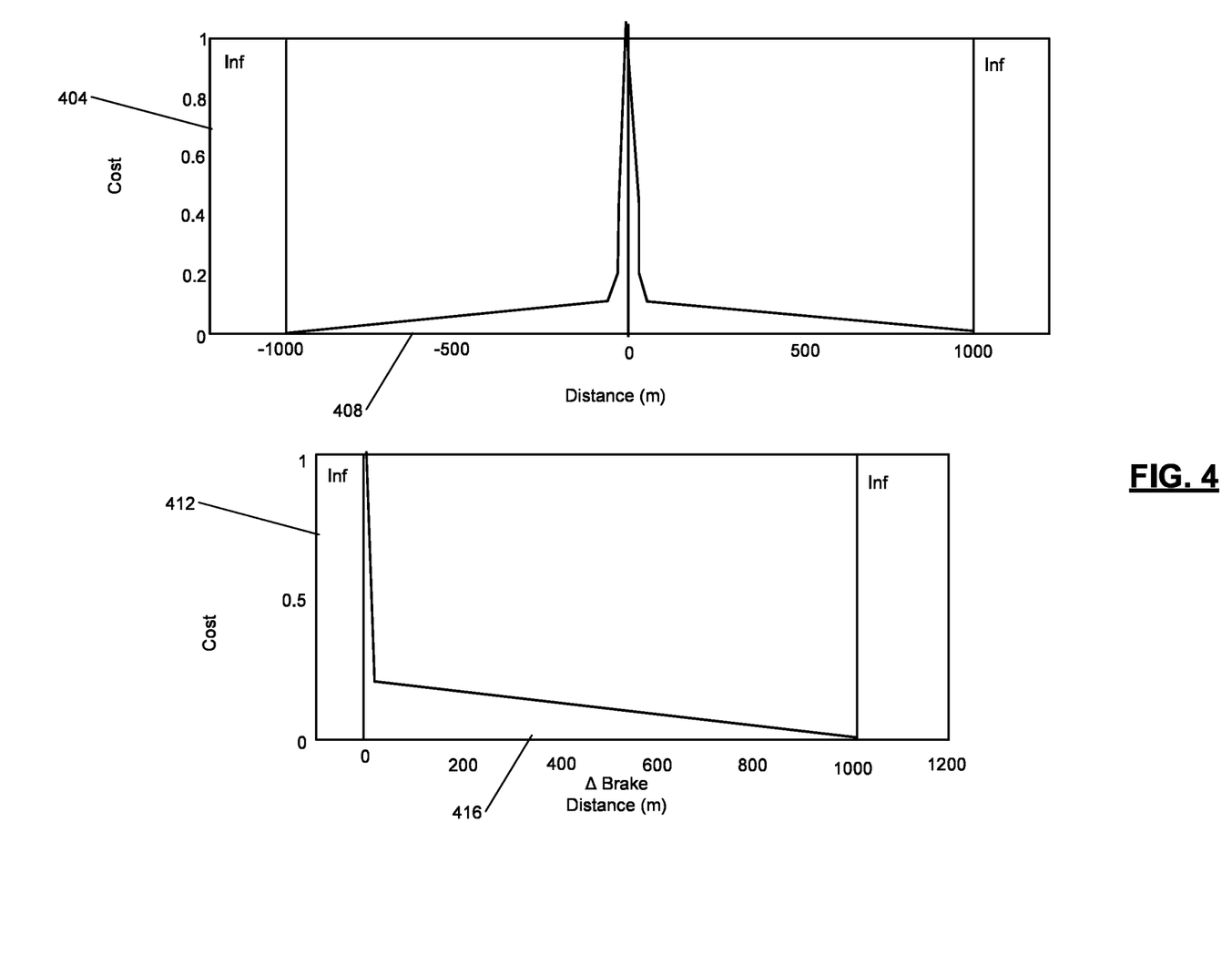
FIG. 4 includes example graphs of cost versus various parameters used for determining the target speed trajectory.

An example equation for determining the cost is $$g\Sigma_{t=0}^{Horizon} k_{safety} C_{safety} + k_{progress} C_{progress} + k_{comfort} C_{comfort} + k_{fuel} C_{fuel},$$

where g is the cost value at a time, horizon is the predetermined period, $C_{safety}$ is a scalar cost for safety, $C_{progressy}$ is a scalar cost for progress, $C_{comfort}$ is a scalar cost for comfort, and $C_{fuel}$ is a scalar cost for fuel consumption. k are predetermined (non-dimensional) weighting factors. The target speed module 216 determines the scalar costs based on the selected set of first driver parameters using one or more equations or lookup tables that relate first driver parameters to the scalar costs. For example, the scalar cost $C_{safety}$ may be a function of a clear distance cost and a braking distance cost. The target speed module 216 may determine the clear distance cost and the clear braking cost based on the selected set of first driver parameters, the vehicle parameters 228, and the second driver parameters 232. The clear distance cost may penalize moving the vehicle too close to surrounding vehicles. However, since it does not consider the vehicles' speeds, the clear brake cost based on the braking distance difference between two vehicles is determined to make sure if the first vehicle suddenly brakes hard, there is still enough space to avoid colliding with the first vehicle. The cost scalar $C_{safety}$ may be set to the maximum (greater) one of the clear distance cost and the clear brake cost. The other scalar costs may be determined similarly. FIG. 4 includes an example graph of cost (clear distance cost) 404 versus clear distance 408, and example graph of cost (clear brake cost) 412 versus change in braking distance 416.

At 324, the target speed module 216 stores the cost of using the selected set of first driver parameters in association with the selected set of first driver parameters in memory. At 328, the target speed module 216 determines whether all of the (e.g., possible or feasible) sets of first driver parameters have been selected and used to determine an associated cost value. If 328 is false, control returns to 316 and another (different) set of first driver parameters is selected for determination of an associated cost. If 328 is true, control continues with 332.

At 332, the target speed module 216 identifies the one of the sets of first driver parameters associated with a minimum (lowest) cost stored in the memory. The identified set of first driver parameters will be used to determine the target speed trajectory 204. The other sets of first driver parameters (with higher cost values) will not be used to determine the target speed trajectory 204 for the present time.

At 336, the target speed module 216 determines the target speed trajectory 204 for the predetermined period based on the identified set of first driver parameters, the vehicle parameters 228, and the second driver parameters 232, using a parametric driver model. The parametric driver model may be embodied as one or more equations and/or lookup tables that relate first driver parameters, vehicle parameters, and second driver parameters to target speeds.

An example equation for determining the target speed trajectory 204 is $$V(k+1) = V(k) + \alpha_{max}(V(k)) * \left[1 - \left(\frac{V(k)}{V_{lim}(S,\gamma)}\right)^{\delta} - \left(\frac{S_{min}(V,V_L)}{S_L}\right)^2 - \left(\frac{S'_{min}(V)}{S_{Stop}}\right)^{\delta stop}\right] * T_s,$$

where V(k+1) is the target vehicle speed at the next time (k+1) after a present time (k) being assessed, V(k) is the vehicle speed 212 at time k, $\alpha_{max}$ is the maximum vehicle acceleration, $V_{lim}$ is a predetermined vehicle speed for driving with free (or no) traffic flow and is a function of S which is a minimum distance when the vehicle 110 stops and y is the speed factor 220, $S_{min}$ is a minimum distance and is determined as provided below, V is the vehicle speed 212, VL is the first vehicle speed 256, $S_L$ is the first vehicle distance 260. $S'_{min}$ is a minimum distance and is determined as provided below, $S_{stop}$ is a distance to stop the vehicle 110, δ is the aggression factor, δstop is the unforced braking parameter, and Ts is the period between each time step (a loop of the example of FIG. 3) within the predetermined time (horizon) for which the target speed trajectory 204 is calculated.

$$S_{min}(V, V_L) = s_O + V(k)T_{gap} + V(k) * \frac{V(k) - V_L(k)}{2\sqrt{\alpha_{max}\beta_{max}}}$$

and $$S'_{min}(V) = s_{O,stop} + V(k)T_{gap,stop} + \frac{V(k)^2}{2\sqrt{\alpha_{max}\beta_{max}}}$$

where $\beta_{max}$ is a maximum deceleration of the vehicle for comfort, $T_{gap,stop}$ is a period to stop factor, $s_O$ is a minimum distance to a first vehicle, $s_{O,stop}$ is a minimum distance to a next stop (e.g., for a traffic light). For the next time after k+1 (i.e., time k+2), the target speed module 216 uses the values for time k+1 in the equations above. The target speed module 216 repeats the determinations such that the target speed trajectory 204 includes a target speed for each time within the next predetermined period.

At 340, one or more control modules of the vehicle 110 control one or more actuators of the vehicle based on the target speed trajectory 204. For example, the control modules may adjust one or more of the actuators to adjust the vehicle speed 212 toward the target speed for time k+1 (the first target vehicle speed in the target speed trajectory 204). For example, the ECM 136 may adjust one or more of the actuators 208 and increase torque output of the engine 114 when the vehicle speed 212 is less than the target speed for time k+1. The braking control module 206 may additionally or alternatively reduce application of the friction brakes 125 when the vehicle speed 212 is less than the target speed and/or decrease regenerative braking. When the vehicle speed 212 is greater than the target speed, the ECM 136 may adjust one or more of the actuators 208 and decrease torque output of the engine 114. Additionally or alternatively, the braking control module 206 may increase application of the friction brakes 125 and/or increase regenerative braking performed.

While the example of adjusting actuators of the vehicle has been provided, the DCM 130 may additionally or alternatively output fuel saving driving maneuvers to a driver of the vehicle based on following the target speed trajectory 204. The fuel saving driving maneuvers may be output, for example, by being displayed on a display of the vehicle 110, being audibly output via one or more speakers of the vehicle 110, or in another suitable manner.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A control system of a vehicle comprising:
   a target speed module configured to, using a parametric driver model and based on first driver parameters, second driver parameters, and vehicle parameters, determine a target vehicle speed trajectory for a future predetermined period;
   a driver parameters module configured to determine the first driver parameters based on conditions within a predetermined distance in front of the vehicle; and
   a control module configured to adjust at least one actuator of the vehicle based on the target vehicle speed trajectory and a present vehicle speed,
   wherein the second driver parameters are predetermined fixed values stored in memory and are selected based on at least one of the conditions and a driver preference.

2. The control system of claim 1 further comprising:
   a camera configured to capture images within a field of view (FOV) in front of the vehicle,
   wherein the driver parameters module is configured to determine the first driver parameters based on at least one image captured by the camera.

3. The control system of claim 1 further comprising a conditions module configured to obtain at least one of the conditions wirelessly from a data source that is remote from the vehicle.

4. The control system of claim 1 wherein the conditions include a speed limit of a road within the predetermined distance in front of the vehicle.

5. The control system of claim 1 wherein the conditions include a grade of a road within the predetermined distance in front of the vehicle.

6. The control system of claim 1 wherein the conditions include a curvature of a road within the predetermined distance in front of the vehicle.

7. The control system of claim 1 wherein the conditions include one of a location of a traffic signal within the predetermined distance in front of the vehicle and a distance between the vehicle and the traffic signal.

8. The control system of claim 1 wherein the conditions include a speed of a vehicle within the predetermined distance in front of the vehicle.

9. The control system of claim 1 wherein the conditions include a distance between the vehicle and a vehicle within the predetermined distance in front of the vehicle.

10. The control system of claim 1 wherein the conditions include:
    a speed limit of a road within the predetermined distance in front of the vehicle;
    a grade of a road within the predetermined distance in front of the vehicle;
    a curvature of a road within the predetermined distance in front of the vehicle;
    one of a location of a traffic signal within the predetermined distance in front of the vehicle and a distance between the vehicle and the traffic signal;
    a speed of another vehicle within the predetermined distance in front of the vehicle; and
    a distance between the vehicle and the other vehicle within the predetermined distance in front of the vehicle.

11. The control system of claim 1 wherein the vehicle parameters include a mass of the vehicle.

12. The control system of claim 1 wherein the vehicle parameters include a present gear ratio of a transmission of the vehicle.

13. The control system of claim 1 wherein the vehicle parameters include torque limits of the vehicle.

14. The control system of claim 1 wherein the vehicle parameters include acceleration limits of the vehicle.

15. The control system of claim 1 wherein:
    the driver parameters module is configured to determine possible sets of the first driver parameters based on the conditions within the predetermined distance in front of the vehicle; and
    the target speed module is configured to:
      determine cost values for the possible sets based on the possible sets, respectively;
      select one of the possible sets having a lowest cost value; and
      using the parametric driver model, based on the selected one of the possible sets of first driver parameters, the second driver parameters, and the vehicle parameters, determine the target vehicle speed trajectory for the future predetermined period.

16. The control system of claim 1 wherein the predetermined period is greater than zero seconds.

17. The control system of claim 1 wherein the control module is configured to, based on the present vehicle speed and the target vehicle speed trajectory, selectively adjust at least one of:
    opening of a throttle valve;
    fuel injection to an engine; and
    spark timing of the engine.

18. A control method for a vehicle, comprising:
    using a parametric driver model and based on first driver parameters, second driver parameters, and vehicle parameters, determining a target vehicle speed trajectory for a future predetermined period;
    determining the first driver parameters based on conditions within a predetermined distance in front of the vehicle; and
    adjusting at least one actuator of the vehicle based on the target vehicle speed trajectory and a present vehicle speed,
    wherein the second driver parameters are predetermined fixed values stored in memory and are selected based on at least one of the conditions and a driver preference.

19. A control system of a vehicle comprising:
    a target speed module configured to, using a parametric driver model and based on first driver parameters, second driver parameters, and vehicle parameters, determine a target vehicle speed trajectory for a future predetermined period;
    a driver parameters module configured to determine the first driver parameters based on conditions within a predetermined distance in front of the vehicle; and
    a control module configured to adjust at least one actuator of the vehicle based on the target vehicle speed trajectory and a present vehicle speed.

* * * * *